United States Patent [19]

Wetzel et al.

[11] 4,414,047

[45] Nov. 8, 1983

[54] METHOD OF MAKING AN ENDLESS POWER TRANSMISSION BELT

[75] Inventors: Robert E. Wetzel; Richard L. Marsh, both of Springfield, Mo.

[73] Assignee: Dayco Corporation, Dayton, Ohio

[21] Appl. No.: 272,637

[22] Filed: Jun. 11, 1981

[51] Int. Cl.³ .................. B29H 7/22; B32B 31/06
[52] U.S. Cl. ....................... 156/138; 156/182; 156/245; 156/274; 474/251
[58] Field of Search ............... 156/137, 138, 140, 141, 156/142, 182, 293, 294, 245; 474/250, 251, 239, 246, 260, 261, 262; 425/28 B, 34 B

[56] References Cited

U.S. PATENT DOCUMENTS

| 2,514,429 | 7/1950 | Waugh | 474/261 |
| 2,699,685 | 1/1955 | Waugh | 474/251 |
| 3,078,206 | 2/1963 | Skura | 756/140 |
| 3,673,883 | 7/1972 | Adams | 156/140 |
| 3,897,291 | 7/1975 | Hoback et al. | 156/140 |
| 4,042,443 | 8/1977 | Hoback et al. | 425/28 B |

*Primary Examiner*—Michael W. Ball
*Attorney, Agent, or Firm*—Joseph V. Tassone

[57] ABSTRACT

A method of making an endless power transmission belt and belt made employing such method are provided wherein the belt has a set of driving teeth on each of pair of opposite surfaces thereof and the belt is adapted to be operated to provide a precision driving action employing the driving teeth on either surface thereof due to such belt having a pair of cooperating helically wound load-carrying cords disposed on a precise pitch line associated with all teeth.

14 Claims, 20 Drawing Figures

METHOD OF MAKING AN ENDLESS POWER TRANSMISSION BELT

BACKGROUND OF THE INVENTION

1. Field of the Invention

This invention relates to a method of making an endless polymeric power transmission belt having a set of driving teeth on each of a pair of opposite surfaces thereof and to a belt made employing such method.

2. Prior Art Statement

So-called positive drive endless polymeric power transmission belts, wherein each belt has a set of driving teeth on each of a pair of opposite surfaces thereof, are well known in the art and many methods have been proposed for making such belts. However, the previously proposed methods have resulted in belts with various deficiencies which include belts having poorly defined driving teeth, belts having teeth with marginal load-carrying capabilities, and belts wherein certain ones of the teeth associated therewith have a pitch line which is poorly defined. In a typical belt of this latter type, the belt pitch line associated with the teeth on one of the opposite surfaces may be fairly accurately defined yet such pitch line once associated with the teeth (backside teeth) on the other of the pair of surfaces is erratic and poorly defined.

It is known in the art to provide a power transmission belt and method of making same wherein such belt has teeth on opposite surfaces thereof for the purpose of improving belt flexibility and as disclosed in U.S. Pat. No. 2,699,685, for example.

It is also known to provide a method of making a belt having driving teeth extending from only one of its surfaces and which employs a wound strand to define a so-called load-carrying band of the belt and as disclosed in U.S. Pat. No. 3,078,206.

It is also known to provide a method of making an endless power transmission belt having a set of driving teeth on each of a pair of opposite surfaces thereof wherein a single load-carrying cord is helically wound and employed as a load-carrying member for each set of driving teeth and as disclosed in U.S. Pat. Nos. 3,673,883, 3,897,291, and 4,042,443.

It is also known to provide a method of making a belt of the character mentioned in the next preceding paragraph by forming the belt in a similar manner as disclosed in the previously mentioned U.S. Pat. No. 3,078,206 and providing an added thickness of polymeric material on the belt portion opposite the toothed portion whereupon the added thickness of polymeric material is cut to define backside teeth therein.

It is an object of this invention to provide an improved method of making an improved endless polymeric power transmission belt having a set of driving teeth on each of a pair of opposite surfaces thereof.

It is another object of this invention to provide an improved belt of the character mentioned.

Other aspects, embodiments, objects, and advantages of this invention will become apparent from the following specification, claims, and drawings.

SUMMARY

In accordance with the present invention there is provided an improved method of making an endless polymeric power transmission belt of the character mentioned which overcomes the above-mentioned deficiencies. The method of this invention comprises the steps of forming a first belt poriton which has a set of teeth extending from an outside surface thereof and which defines one of the pair of opposite surfaces, helically winding a first load-carrying cord to define a part of the first belt portion, forming a second belt portion which has a set of teeth extending from an outside surface thereof which defines the other of the pair of opposite surfaces, bonding the belt portions together to define a belt sleeve having the first load-carrying cord therebetween, and cutting the belt sleeve to define the belt from a portion thereof.

In accordance with one embodiment of the improved method of this invention the step of helically winding the first cord comprises winding the first cord on a right hand helix along substantially cylindrical means of a given diameter to define a precise pitch line for the first belt portion and with the first cord being disposed substantially outwardly of the completed first belt portion, and the improved method comprises the further steps of helically winding a second load-carrying cord on a left hand helix along substantially cylindrical means of the same given diameter to define a part of the second belt portion and a precise pitch line therefor with the second cord being disposed substantially outwardly of the complete second belt portion, inverting one of the portions, and disposing the inverted portion concentrically around the other belt portion prior to the above-mentioned bonding step with the first and second cords having helical turns thereof of substantially identical size and arrangement disposed in an alternating manner across the width of the belt, whereupon the belt is adapted to be operated to provide a precision driving action employing the driving teeth on either belt portion thereof due to each belt portion having the first and second load-carrying cords on a precise pitch line.

Also provided in accordance with this invention is an improved belt of the character mentioned which is made employing the method of this invention.

BRIEF DESCRIPTION OF THE DRAWINGS

The accompanying drawings show present preferred embodiments of this invention, in which.

DETAILED DESCRIPTION

Figures 17, 18, 19:
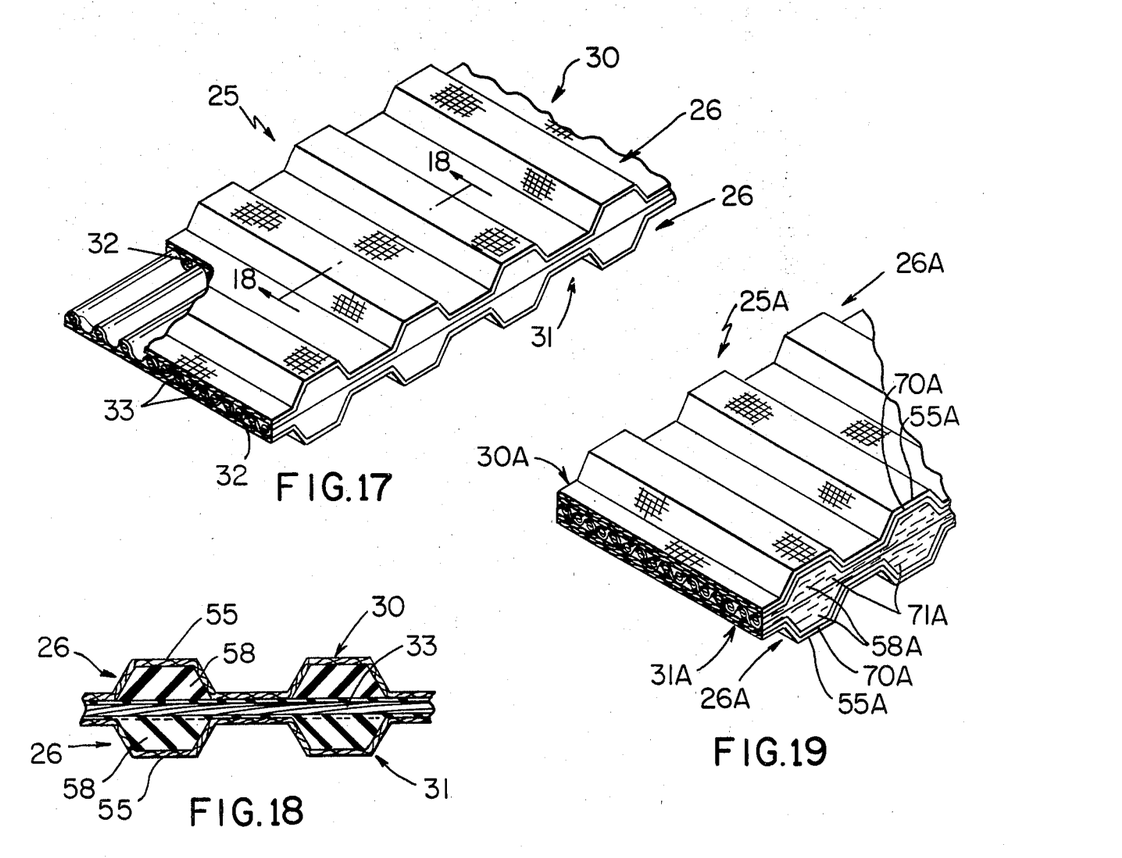
FIG. 17 is an isometric view with parts broken away illustrating a straight section of a typical belt as defined after cutting thereof in FIG. 16.
FIG. 18 is a fragmentary cross-sectional view taken essentially on the line 18—18 of FIG. 17.
FIG. 19 is a view similar to FIG. 17 illustrating another exemplary embodiment of a belt which may be made utilizing the method of this invention.

Reference is now made to FIG. 17 of the drawings which illustrates one exemplary embodiment of an endless polymeric power transmission belt made in accordance with the teachings of this invention and such belt is designated generally by the reference numeral 25. The belt 25 is of a type often popularly referred to as a positive drive belt or a synchronous belt and has a set of driving teeth on each of a pair of opposite surfaces thereof and each set of driving teeth is designated generally by the reference numeral 26. The belt 25 is comprised of the first belt portion 30 and a second belt portion 31 and such belt 25 is adapted to be operated to provide a precision driving action employing the driving teeth 26 on either belt portion 30 or 31 thereof due to each belt portion having load-carrying cords 32 and 33 associated therewith which are on a precise pitch line and as will be described in detail subsequently.

The method of this invention will now be described in connection with FIGS. 1–16 of the drawings. The method comprises the steps of forming the first belt portion 30 (shown completed in FIG. 10), and such belt portion has a set of teeth 26 extending from an outside surface 34 thereof; and, the surface 34 defines one of the pair of opposed surfaces of the belt 25. The method comprises the step of helically winding what will be referred to as a first load-carrying cord 32, as illustrated in FIGS. 2, to define a part of the first belt 30.

Figures 10, 11, 12:
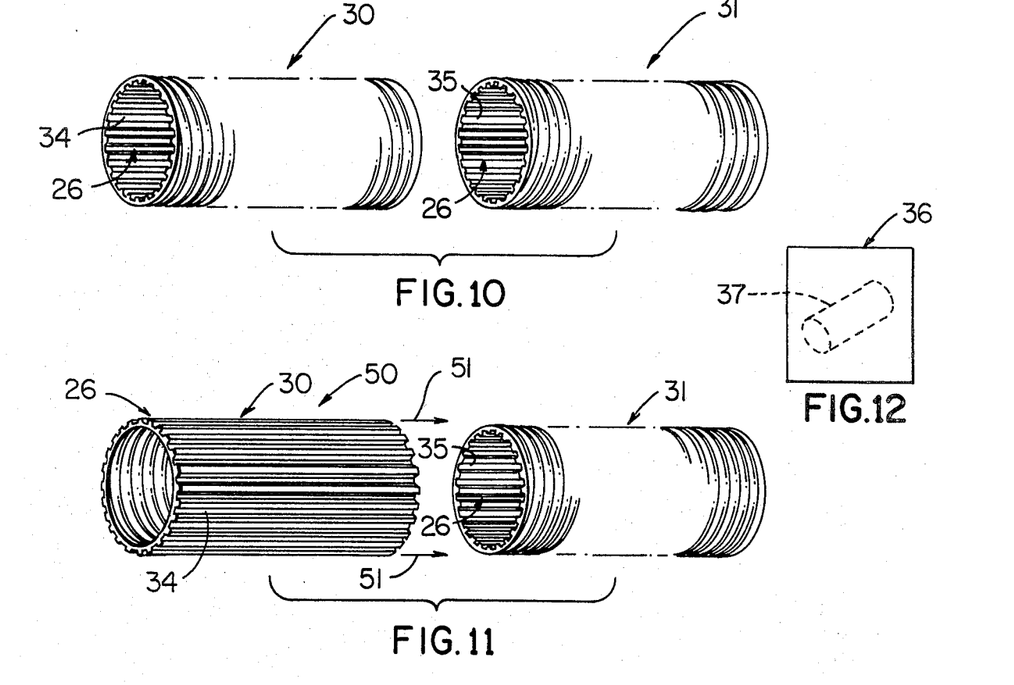
FIG. 10 is an isometric view particularly illustrating first and second formed belt portions disposed in side-by-side relation with such belt portions being the completed portions which were shown in their partially formed condition and in corresponding positions in FIG. 2.
FIG. 11 is a view similar to FIG. 10 illustrating the step of inverting the belt portion shown at the left and disposing the inverted belt portion concentrically around the other belt portion.
FIG. 12 is a schematic presentation illustrating the step of bonding together the belt portions, as disposed in FIG. 11, to define a belt sleeve.
Figure 13:
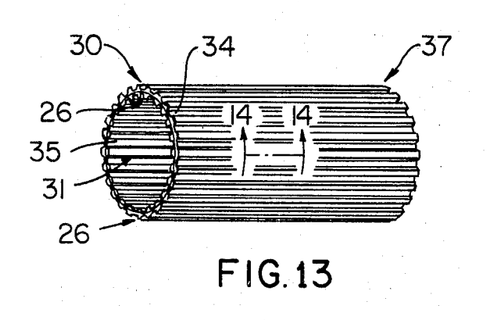
FIG. 13 is an isometric view illustrating the belt portions bonded together and defining the belt sleeve.
Figure 14:
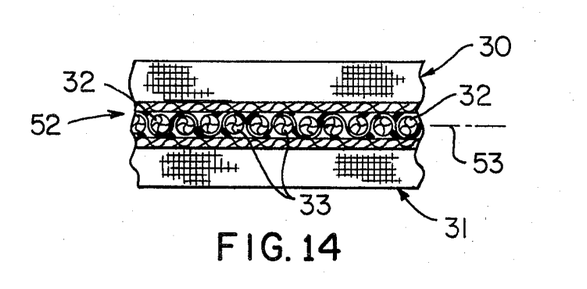
FIG. 14 is a cross-sectional view taken essentially on the line 14—14 of FIG. 13 and wherein some polymeric material, shown as rubber, is disposed above and below the load-carrying cords of each belt portion.

The method also comprises the step of forming (FIG. 10) a second belt portion 31 which has a set of teeth 26 extending from an outside surface 35 thereof which defines the other of the pair of surfaces of the belt 25; and, such method comprises the step of bonding the belt portions 30 and 31 together as illustrated schematically at 36 in FIG. 12 to define a belt sleeve which is designated generally by the reference numeral 37 and such sleeve has the load-carrying cord 32 and the cord 33 (as will be described later) between its belt portions 30 and 31.

Figure 16:
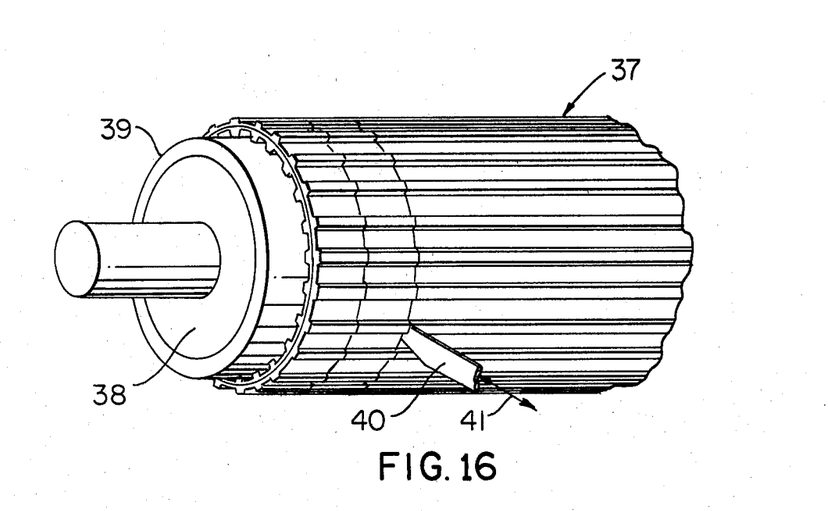
FIG. 16 is a fragmentary isometric view illustrating the step of cutting the belt sleeve of FIG. 13 to define a plurality of belts.

The belt sleeve 37 is cut to define the belt 25 from a portion thereof and the cutting step is illustrated in FIG. 16. The cutting action is achieved by disposing the completed sleeve 37 on a suitable cutting mandrel 38 which has a yieldable pad 39 and employing a cutter 40 which is shown schematically. The cutter 40 may be operated by suitable actuating means, designated by a double arrow 41, while rotating the mandrel 38, and as is known in the art.

Figure 2:
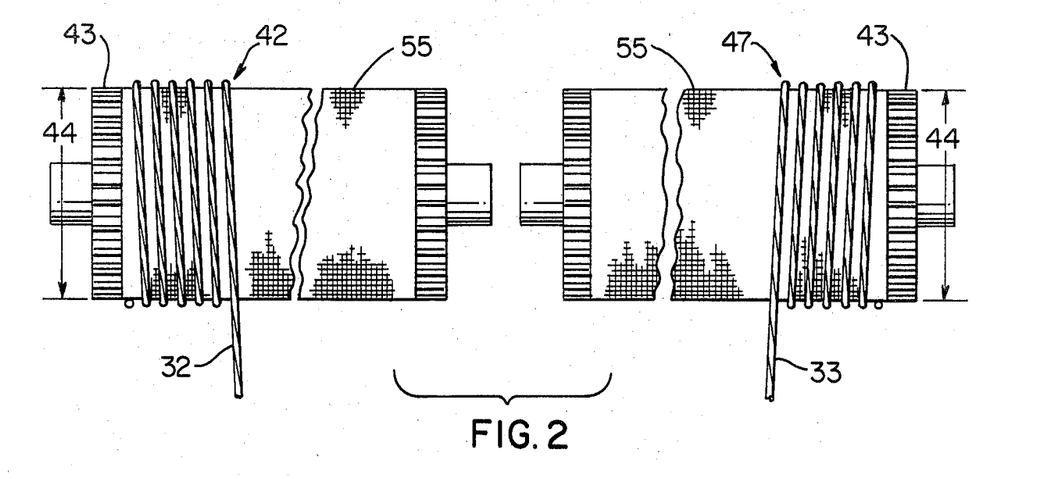
FIG. 2 is a view illustrating the step of helically winding an associated load-carrying cord against the fabric layer with the cord shown at the left of FIG. 2 being wound on a right hand helix and the cord at the right of FIG. 2 being wound on a left hand helix.

In accordance with the method of this invention, the step of helically winding the cord 32, as illustrated in FIG. 2, comprises winding such cord on a right hand helix as illustrated at 42 and along substantially cylindrical means of a given diameter. The cylindrical means in this example is a building drum 43 which will be described in more detail later and such drum has a given diameter 44 and the winding of cord 32 thereabout defines a precise pitch line for the first belt portion 30 which is shown substantially completed in FIG. 10; and, in the completed belt portion the cord 32 is disposed substantially outwardly of such completed belt portion as shown typically at 45 in FIG. 9 and as will be further described subsequently.

The method of this invention comprises the further step of helically winding the previously mentioned second load-carrying cord 33 on a left hand helix, as shown at 47 in FIG. 2, along substantially cylindrical means in the form of a building drum which is substantially identical to the building drum previously described and thus will also be designated by the reference numeral 43. Accordingly, this latter mentioned drum 43 also has a diameter 44 which is substantially identical dimensionally to previously described diameter 44; and, the cord 33 defines a portion of the second belt portion 31 and a precise pitch line therefor. The cord 33 is disposed substantially outwardly of its completed belt portion 31 and as illustrated at 45 in FIG. 9 for the belt portion 30 and its load-carrying cord 32. It will be appreciated that the method steps of FIGS. 3 through 9 are fully applicable to both belt portions 30 and 31.

In accordance with the teachings of this invention one of the belt portions, shown as the belt portion 30 in this example of the invention, is evaginated or inverted as illustrated at 50 in FIG. 11. The inverted portion 30 is then disposed concentrically around the belt portion 31, indicated schematically by the arrows 51 in FIG. 11, and this is achieved prior to the bonding step illustrated at 36 in FIG. 12. This disposal of the inverted portion 30 concentrically around the belt portion 31 is such that the first and second cords 32 and 33 respectively have helical turns thereof disposed in an alternating manner across the width of the belt and as illustrated at 52 in FIG. 14. With this arrangement it will also be seen that the cords 32 and 33 have centers which are adapted to lie substantially on a common theoretical right circular cylinder which is indicated by a dot-dash line 53 in FIGS. 14 and 15; and, this construction and arrangement assures the previously mentioned performance characteristic that the belt is adapted to be operated to provide a precision driving action employing the driving teeth on either belt portion 30 or 31 due to each belt portion having load-carrying cords 32 and 33 on a precise pitch line.

Figure 1:
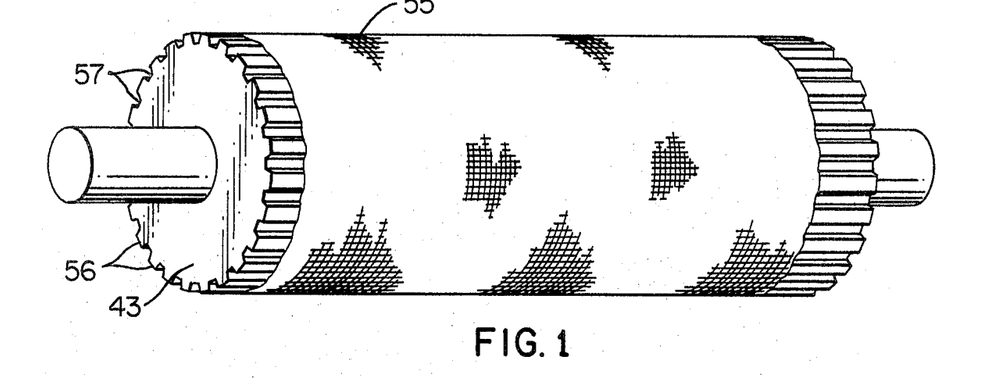
FIG. 1 is an isometric view illustrating an initial belt foming step which is substantially identical for forming a first and a second belt portion and comprises wrapping a fabric layer around cylindrical means.

As indicated earlier, except for the helical winding of cord 32 on a right hand helix for belt portion 30 and the helical winding of cord 33 on a left hand helix for the belt portion 31, the basic steps of forming each of the belt portions are substantially identical. Accordingly, a fabric layer 55 is, in each instance, wrapped about the previously mentioned cylindrical means or building drum 43 as shown in FIG. 1. Each drum 43 has axially extending alternating projections 56 and grooves 57 which are adapted to define an associated set of driving teeth for its belt portion 30 or 31. The fabric layer 55 is wrapped around the drum 43, preferably without overlapping of the ends thereof and such ends may be adhesively fastened, sewn, or otherwise fixed together as is known in the art so as to eliminate any increased thickness which might be caused by overlap.

Following the wrapping of the fabric layer 55 in position the associated load-carrying cord 32 or 33 is then helically wound in position with the cord 32 being wound on a right hand helix to comprise the belt portion 30 and the cord 33 being wound on a left hand helix to comprise the belt portion 31. Although the cords 32 and 33 comprising belt portions 30 and 31 respectively are wound in opposite directions, the right hand helix angle of the cord 32 is equal to the left hand helix angle of the cord 33 and this enables precise alternating disposal of the turns of cords 32 and 33 once the belt portion 30 is inverted and disposed around the belt portion 31.

Figure 3:
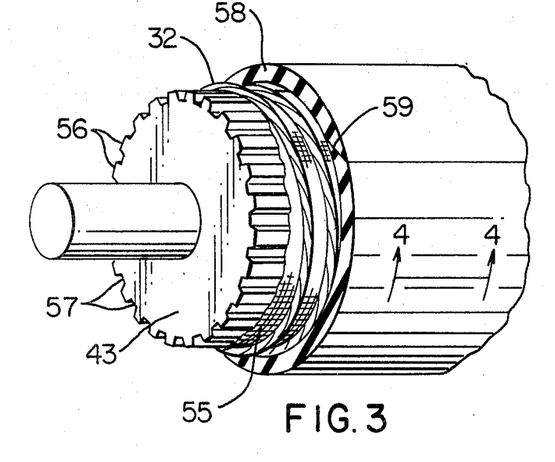
FIG. 3 is an enlarged isometric view with parts in elevation, parts in cross-section, and parts broken away showing the steps of placing a polymeric layer around a fabric layer with a load-carrying cord wound in position.
Figure 4:
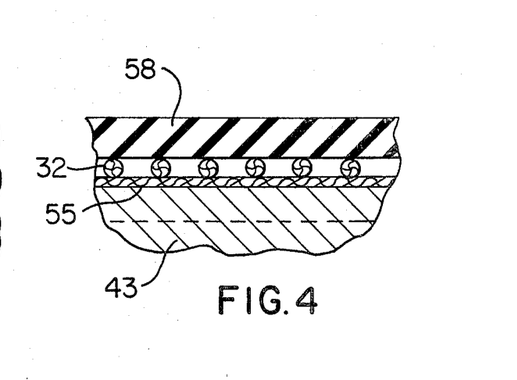
FIG. 4 is an enlarged fragmentary cross-sectional view taken essentially on the line 4—4 of FIG. 3.

Once each cord 32 and 33 is wound in position around its associated fabric layer 55 and building drum 43, a polymeric layer which is designated by the same reference numeral 58 in each instance, is placed in position by winding same around and against its associated cord, either 32 or 33. In the illustration of FIG. 3 a polymeric layer in the form of a rubber layer 58 is wound around the cord 32 and the rubber layer 58 is joined on a bevel joint 59.

The forming of each belt portion 30 and 31 in this example of the method comprises forming each portion 30 and 31 of either partially cured or fully cured polymeric material. More specifically such partial or final curing is provided by subjecting the assembly of components defined in each instance by fabric layer 55, cord 32 of 33, and rubber layer 58 to a curing environment. The curing environment is provided by a curing apparatus 60 which is shown schematically in FIG. 7.

During curing in apparatus 60 the precise forming of each belt portion 30 or 31 takes place and comprises applying pressure against the polymeric or rubber layer 58 to thereby force such rubber layer 58 through the helical turns of its associated cord either 32 or 33 and define an associated one of the belt portions. This technique of winding a cord (either 32 or 33) against a fabric layer 55, placing a rubber layer 58 outwardly of and around the fabric layer and against an associated load-carrying cord, and then applying pressure against the rubber layer during curing is basically disclosed in the above-mentioned U.S. Pat. No. 3,078,206. Accordingly, the disclosure of this patent as to the above technique together with all other details disclosed therein including type of fabric, rubber compound, and load-carrying cord used are incorporated herein by reference thereto.

Figures 5, 6, 7, 9:
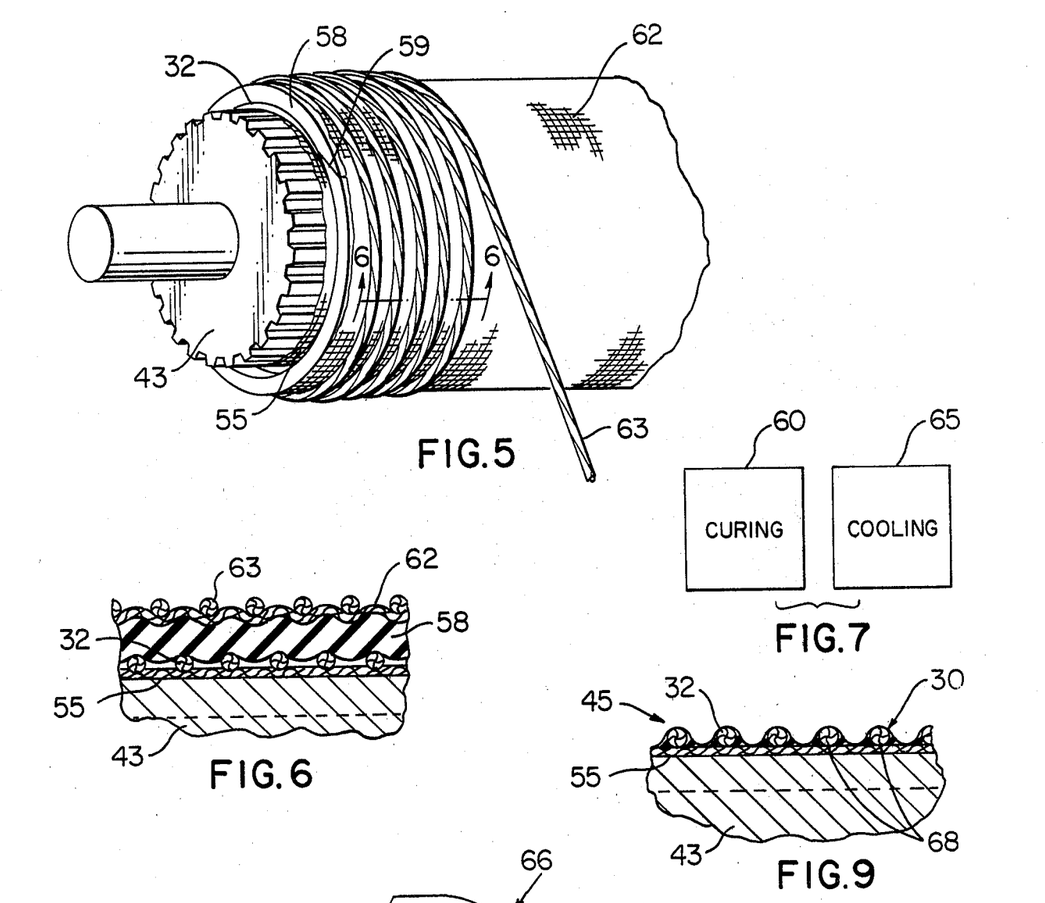
FIG. 5 is a fragmentary isometric view illustrating the step of winding a release sheet around an associated polymeric layer and the coiling of a tensioning member against the release sheet for the purpose of aiding in the application of radially inwardly directed pressure to the polymeric layer.
FIG. 6 is an enlarged fragmentary cross-sectional view taken essentially on the line 6—6 of FIG. 5.
FIG. 7 is a schematic illustration presenting the steps of curing and cooling the assembly of components as presented in FIG. 6.
FIG. 9 is a fragmentary cross-sectional view taken essentially on the line 9—9 of FIG. 8 and illustrating the optimum arrangement of componenets wherein the load-carrying cord is disposed against the outside fabric layer of its belt portion.

In accordance with teachings of this invention the application of pressure during either partial or full curing of each belt portion 30 and 31 may be aided by means other than the fluid pressure employed in the curing apparatus 60. For example, and as illustrated in FIGS. 5 and 6 of the drawings, pressure may also be applied initially by winding a release sheet 62 around an associated layer of rubber material 58 followed by winding a tensioning member 63 around and against the release sheet. The release sheet 62 may be any suitable sheet employed in the art for this purpose and is preferably a release fabric which is stretchable axially along its building drum 43 and comparatively non-stretchable circumferentially. The release sheet 62 serves to transmit pressure from the member 63 and the fluid in the apparatus 60 and is suitably treated to enable removal of the sheet 62 from around the layer 58 following curing in apparatus 60.

The step of applying pressure also comprises the step of winding or coiling the tensioning member or tensioning cord 63 around and against the release sheet 62 as mentioned above. The tensioning cord 63 is preferably made of a heat-shrinkable material such as a suitable polyester which is activated during curing.

The tensioning cord 63 is coiled in a helical pattern so that each turn thereof is disposed radially outwardly of and substantially between immediately adjacent turns of its associated cord either 32 or 33. This arrangement serves to force the associated polymeric layer 58 through the helical turns of its associated cord 32 or 33, in a precisely controlled manner.

Following wrapping of the release sheet 62 and cord 63 the entire assembly, illustrated in FIG. 6, is then disposed in the curing apparatus 60 whereby the fluid in apparatus 60 and member 63 cooperate to exert radially inwardly directed pressure against the release sheet 62 and tensioning member 63 during curing in a known manner forcing the rubber of layer 58 through the helical turns of its cord, 32 or 33, and against the fabric layer 55 defining the tooth form of an associated belt portion 30 or 31. The rubber of layer 58 may also flow through open areas of the fabric 55 and provide rubber between the fiber portions thereof. Also, depending on the load-carrying cord used and on manufacturing conditions some rubber may flow around each load-carrying cord 32 or 33 and this is shown in a greatly exaggerated manner in FIGS. 14, 15, 17, 18, and 19 for ease of drawing presentation.

As stated earlier the tensioning member 63 is made of a heat shrinkable material and as it shrinks with the heat provided in apparatus 60, it helps force the polymeric layer through the helical turns of the associated cord. It will also be noted that the tensioning member is wound so that each turn thereof is disposed radially outwardly of and substantially between the immediately adjacent turns of its associated cord 32 or 33 and serves to force the associated polymeric or rubber layer 58 through the helical turns of the associated cord in a precisely controlled manner.

The construction illustrated in FIG. 6 is then suitably cooled in a cooling apparatus 65, as shown in FIG. 7. The cooling apparatus 65 may be of any suitable type employed in the art.

Figure 8:
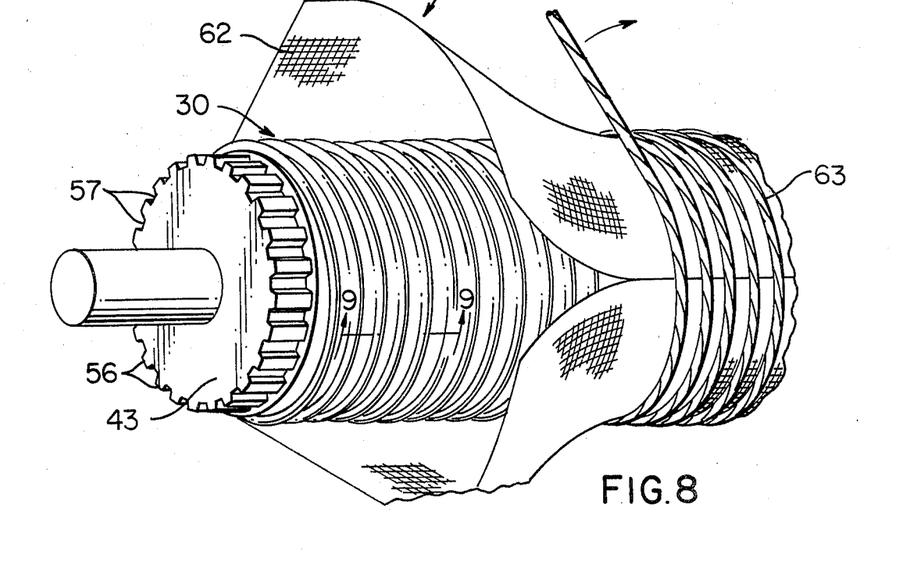
FIG. 8 is a fragmentary isometric view illustrating the step of removing the tensioning member and release sheet after curing and cooling of the assembly of FIG. 6.

The tensioning member or cord 63 and release sheet 62 are then removed as illustrated at 66 in FIG. 8 and the completed or formed belt portion (30 or 31) here shown as belt portion 30 (FIG. 8) is then removed from its building drum. It will be seen typically for the belt portion 30 in FIG. 9 that its cord 32 is ideally disposed against its fabric layer 55 as shown at 68 and is disposed substantially outwardly of the completed belt portion as illustrated at 45. The cord 33 is also ideally disposed against its fabric layer 55 and is disposed substantially outwardly of its belt portion 31 in a similar manner.

Figure 15:
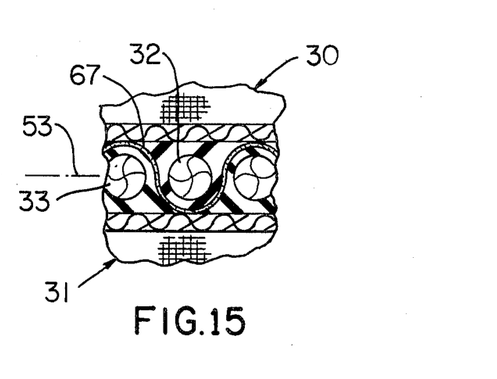
FIG. 15 is an enlarged view of a portion of the illustration of FIG. 14.
Figure 15A:
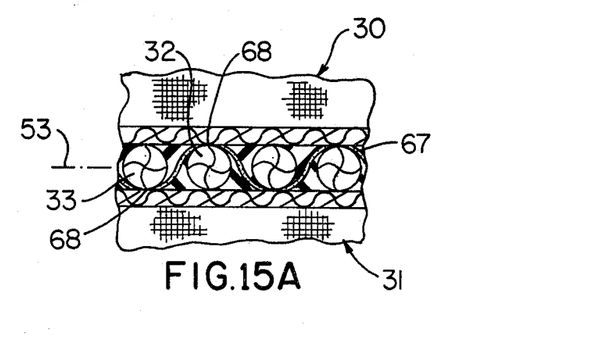
FIG. 15A is a view similar to FIG. 15 and illustrating the preferred optimum construction once the belt portions are fixed together.

The belt portions 30 and 31 may then be bonded together during the bonding step illustrated in FIG. 12 and such bonding in this example of the invention may comprise fixing the belt portions together employing adhesive means 67 as illustrated in FIGS. 15 and 15A. The adhesive means 67 may be any adhesive which is compatible with the rubber or the polymeric material which defines the belt portions.

However, the first and second belt portions 30 and 31 which are defined essentially as described above utilizing the release sheet 62 and tensioning cord 63 may be only partially cured in the curing apparatus 60. In this latter instance, the partially cured belt portions are disposed together and bonded during the bonding step shown schematically at 36 in FIG. 12 to define the belt sleeve 37. The bonding in this instance amounts to a final curing of portions 30 and 31 in a curing apparatus of known construction. The schematic showing at 36 is intended to define adhesive bonding, as before, as well as bonding by final curing, as now presented.

Another exemplary embodiment of the belt of this invention is illustrated in FIG. 19 of the drawings. The belt illustrated in FIG. 19 is very similar to the belt 25; therefore, such belt will be designated by the reference number 25A and representative parts of such belt which are similar to the corresponding parts of the belts 25 will be designated in the drawings by the same reference numerals as in the belt 25 (whether or not such representative parts are mentioned in the specification) followed by the letter designation A and not described again in detail. Only those component parts of the belt 25A which are substantially different from corresponding parts of the belt 25 will be designated by a new reference number also followed by the letter designation A and described in detail.

The belt 25A is also comprised of a first belt portion 30A and a second belt portion 31A and has a set of driving teeth 26A on each belt portion 30A and 31A. The main difference between the belt 25A and the belt 25 is that the belt 25A has not only an outer fabric layer 55A provided on each belt portion 30A and 31A, but the belt 25A also has a second fabric layer 70A which is disposed inwardly of each fabric layer 55A and is suitably bonded thereto during forming. The belt 25A is made in a substantially identical manner as the belt 25 and employing the same basic method steps.

The only exception is that each forming step comprises wrapping a second fabric layer 70A which is stretchable circumferentially around an associated fabric layer 55A whereby the belt 25A has two outer fabric layers defining the outer portion of each set of driving teeth. The belt 25A also has suitable strengthening means embedded in the polymeric matrix 58A of each belt portion 30A and 31A and in this example such strengthening means comprises a plurality of discrete randomly disposed strengthening fibers 71A.

The fibers 71A may be made of any suitable fibrous material utilized in the art of making endless power transmission belts, including organic materials, and such fibers may have diameters ranging between 0.001 inch and 0.050 inch and lengths ranging between 0.001 inch and several inches. The function of the fibers is well known in the art and the disposal thereof may be parallel, perpendicular, or at any desired angle relative to the longitudinal axis of the belt. It will also be appreciated that the belt 25 may also be provided with reinforcing fibers 71A or the belt 25A may be provided without fibers. Further, both belts 25 and 25A may be provided with other suitable strengthening means therein as is known in the art.

Each layer 55, 55A and 70A is preferably a fabric layer which is stretchable circumferentially and basically non-strectchable axially. This construction facilitates disposal of each fabric layer around its building drum 43 and also enables the fabric to be readily urged in position so that it follows the contours defined by the projections 56 and grooves 57 of its drum 43. In addition, each fabric layer may be of any suitable fabric known in the art including woven fabric, non-woven fabric, knitted fabric, double knitted fabric, fabric in which long parallel strands are disposed in side-by-side relation and held together by sewing at spaced intervals, and the like. Further, the outer layer, defining the belt teeth, need not necessarily be made of fabric but may be made of any material employed in the art of making positive drive belts.

In this disclosure of the invention the helically wound cord 32 associated with the belt portion 30 occupies roughly 40% of the open surface area around the building drum 43 outwardly of its fabric layer 55. Similarly, the helically wound cord 33 associated with the belt portion 31 occupies roughly 40% of the open area outwardly of its fabric layer 55. Once the belt portions 30 and 31 are bonded together to define the belt 25 the centers of the two initially separate cords 32 and 33 are adapted to lie on a theoretical right circular cylinder 53, as mentioned earlier.

It is also to be understood that it may be preferable to cut away, or otherwise remove, a part of the polymeric material or rubber surrounding the cords 32 and 33, i.e., rubber adjacent each of such cords, to assure intermeshing of the alternating individual helical turns in a precise manner, as described earlier, enabling the centers of such cords to lie on the above-mentioned theoretical right circular cylinder 53. The cutting or removal may be provided to define either the construction of FIG. 15 or the optimum construction of FIG. 15A. This removal or cutting may be achieved using any technique known in the art.

The load-carrying cords 32 and 33 embedded in the belt portions 30 and 31 respectively are preferably inextensible cords of any type used in the art of making belts having teeth which are used for driving purposes; and, such cords may be made of any suitable material.

It will also be appreciated that each load-carrying cord (such as cord 32 and 33) may be made of elements, i.e., twisted filaments or fibers, which may be twisted in various directions. For example, the cord 32 may be made of elements which are twisted in one direction and the cord 33 may be made of elements which are twisted in an opposite direction. Further, the cords 32 and 33 may be made of elements which are twisted in the same direction, as desired.

In this disclosure of the invention the polymeric material employed in each belt is shown in the drawings as rubber, and it will be appreciated that such rubber may be either natural rubber or synthetic rubber. However, as suggested earlier, it is to be understood that the polymeric material need not necessarily be rubber but may be any synthetic plastic material used in the art.

In this disclosure of the invention the teeth in each belt portion are of equal size and each tooth in one belt portion has a corresponding tooth at the same circumferential position in the other belt portion; however, it is to be understood that the teeth in one belt portion (such as portion 30 for example) may be staggered circumferentially relative to equal size teeth in the other belt portion (portion 31 for example). Also, the equal-size teeth in one belt portion may be of one size and the equal-size teeth in the other belt portion may be of a different size.

The drawings of this disclosure illustrate synchronous or positive drive belts having teeth of trapezoidal cross-sectional configuration; however, it is to be understood that the method of this invention may be used to make synchronous belts having teeth of any configuration known in the art, such as, the configurations shown in U.S. Pat. Nos. 3,756,091 and 3,924,481, for example.

While present exemplary embodiments of this invention, and methods of practicing the same, have been illustrated and described, it will be recognized that this invention may be otherwise variously embodied and practiced within the scope of the following claims.

What is claimed is:

1. In a method of making an endless polymeric power transmission belt having a set of driving teeth on each of a pair of opposite surfaces thereof, said method comprising the steps of, forming a first belt portion which has a set of teeth extending from an outside surface thereof which defines one of said pair of opposite surfaces, helically winding a first load-carrying cord to define a part of said first belt portion, forming a second belt portion which has a set of teeth extending from an outside surface thereof which defines the other of said pair of opposite surfaces, bonding said belt portions together to define a belt sleeve having said first load-carrying cord therebetween, and cutting said belt sleeve to define said belt from a portion thereof, the improvement in said method wherein said step of helically winding said first cord comprises winding said first cord on a right hand helix along substantially cylindrical means of a given diameter to define a precise pitch line for said first belt portion, said first cord being disposed substantially outwardly of the completed first belt portion, and comprising the further steps of helically winding a second load-carrying cord on a left hand helix along substantially cylindrical means of said given diameter to define a part of said second belt portion and a precise pitch line therefor, said second cord being disposed substantially outwardly of the completed second belt portion, inverting one of said portions, and disposing said inverted portion concentrically around the other belt portion prior to said bonding step with the first and second cords having helical turns thereof of substantially identical size and arrangement disposed in an alternating manner across the width of said belt, said belt being adapted to be operated to provide a precision driving action employing the driving teeth on either belt portion thereof due to each belt portion having said first and second load-carrying cords on a precise pitch line.

2. A method as set forth in claim 1 in which said bonding step comprises fixing said belt portions together employing adhesive means.

3. A method as set forth in claim 1 in which said steps of forming said first and second belt portions comprise forming each of said belt portions substantially of polymeric material comprising cured rubber and said bonding step comprises fixing said belt portions together with adhesive means.

4. A method as set forth in claim 1 in which said steps of forming said first and second belt portions comprise forming each of said belt portions substantially of polymeric material comprising partially cured rubber, and said bonding step comprises final curing said belt portions following said disposing step to provide said bonding during said final curing.

5. A method as set forth in claim 1 in which each of said forming steps comprises wrapping a fabric layer which is stretchable circumferentially around a building drum having axially extending alternating projections and grooves which define an associated set of driving teeth and placing a polymeric layer around said fabric layer; each of said helically winding steps comprises helically winding as associated cord against its fabric layer prior to an associated placing step; and each forming step comprises the steps of at least partially curing each associated fabric layer, polymeric layer, and cord; each forming step also comprising the step of applying pressure against the polymeric layer during curing to force the polymeric layer through the helical turns of the associated cord and define an associated one of said belt portions.

6. A method as set forth in claim 5 in which said step of applying pressure comprises, winding a release sheet around an associated layer of polymeric material, coiling a tensioning member against said release sheet, and exerting radially inwardly directed fluid pressure against said release sheet and tensioning member during said curing step, said tensioning member helping to force its polymeric layer through the helical turns of its associated cord, and removing said tensioning member and release sheet prior to said disposing step.

7. A method as set forth in claim 6 in which said step of winding a release sheet comprises winding a release fabric which is stretchable axially along its building drum and is substantially non-stretchable circumferentially about such building drum.

8. A method as set forth in claim 7 in which said coiling step comprises coiling said tensioning member made of a heat-shrinkable material which is activated during curing.

9. A method as set forth in claim 5 in which each of said forming steps comprises wrapping a second fabric layer which is stretchable circumferentially around an associated first-named fabric layer to thereby define said driving belt having two outer fabric layers on the set of driving teeth provided on each of its pair of opposite surfaces.

10. A method as set forth in claim 6 in which said step of coiling said tensioning member comprises coiling said tensioning member in a helical pattern so that each turn thereof is disposed radially outwardly of and substantially between immediately adjacent turns of its associated cord thereby forcing the associated polymeric layer through said helical turns of the associated cord in a precisely controlled manner.

11. A method as set forth in claim 5 in which said step of wrapping a fabric layer comprises wrapping said fabric layer made of woven material.

12. A method as set forth in claim 11 in which said step of coiling a tensioning member made of a heat-shrinkable material comprises coiling said tensioning member made of a heat-shrinkable polyester.

13. A method as set forth in claim 5 in which said step of helically winding said first cord comprises the preparation step of twisting component elements of said first cord in one direction to define said first cord and said step of helically winding said second cord comprises the preparation step of twisting component elements of said second cord in an opposite direction from the elements of said first cord to define said second cord.

14. A method as set forth in claim 5 in which said step of helically winding said first cord comprises the preparation step of twisting component elements of said first cord in one direction to define said first cord and said step of helically winding said second cord comprises the preparation step of twisting component elements of said second cord in the same direction as the elements of said first cord to define said second cord.

* * * * *